UNITED STATES PATENT OFFICE.

CHARLES ISELIN AND DANIEL CALLAHAN, OF RIVERSIDE, CALIFORNIA.

REMEDY FOR ASTHMA.

SPECIFICATION forming part of Letters Patent No. 437,599, dated September 30, 1890.

Application filed April 4, 1890. Serial No. 346,596. (No specimens.)

*To all whom it may concern:*

Be it known that we, CHARLES ISELIN and DANIEL CALLAHAN, both of Riverside, in the county of San Bernardino and State of California, have invented a new and useful Medicine for the Treatment of Asthma, of which the following is a specification.

Our composition consists of the following ingredients, combined in the proportions stated, viz: Brandy, one-half pint; honey, one-half pint; olive-oil, one-half pint; vinegar, one-half pint; Turkish rhubarb, one-half ounce. Boil the mixture slowly for fifteen minutes, let it get cold, and then bottle it.

This medicine is to be taken as follows: one table-spoonful before breakfast and one table-spoonful before going to bed.

What we claim as new, and desire to secure by Letters Patent, is—

The herein-described composition of matter to be used as a medicine for the treatment of asthma, consisting of brandy, honey, olive-oil, vinegar, and rhubarb, combined in about the proportions specified.

CHARLES ISELIN.
DANIEL CALLAHAN.

Witnesses:
F. A. MILLER,
PERRIN E. WHITE.